(12) United States Patent
Hahn et al.

(10) Patent No.: US 8,991,863 B2
(45) Date of Patent: Mar. 31, 2015

(54) LOCKING DEVICE FOR AN ADJUSTABLE STEERING COLUMN

(71) Applicant: Thyssenkrupp Presta Aktiengesellschaft, Eschen (LI)

(72) Inventors: Michael Hahn, Au (CH); Martin Fleischer, Balgach (CH)

(73) Assignee: Thyssenkrupp Presta Aktiengesellschaft, Eschen (LI)

(*) Notice: Subject to any disclaimer, the term of this patent is extended or adjusted under 35 U.S.C. 154(b) by 0 days.

(21) Appl. No.: 14/369,336

(22) PCT Filed: Dec. 6, 2012

(86) PCT No.: PCT/EP2012/005044
§ 371 (c)(1),
(2) Date: Jun. 27, 2014

(87) PCT Pub. No.: WO2013/097922
PCT Pub. Date: Jul. 4, 2013

(65) Prior Publication Data
US 2014/0373663 A1    Dec. 25, 2014

(30) Foreign Application Priority Data
Dec. 28, 2011   (DE) .......................... 10 2011 057 104

(51) Int. Cl.
*B62D 1/184*    (2006.01)

(52) U.S. Cl.
CPC ...................................... *B62D 1/184* (2013.01)
USPC ............................................. 280/775; 74/493

(58) Field of Classification Search
CPC ....................................................... B62D 1/184
USPC ........................................... 280/775; 74/493
See application file for complete search history.

(56) References Cited

U.S. PATENT DOCUMENTS

| 5,088,767 A | 2/1992 | Hoblingre et al. |
| 5,394,767 A | 3/1995 | Hoblingre et al. |

(Continued)

FOREIGN PATENT DOCUMENTS

| DE | 31 38 083 | 6/1982 |
| DE | 695 00 927 | 4/1998 |

(Continued)

OTHER PUBLICATIONS

International Search Report (ISR) issued Mar. 14, 2013 in International (PCT) Application No. PCT/EP2012/005044.

*Primary Examiner* — Ruth Ilan
(74) *Attorney, Agent, or Firm* — Wenderoth, Lind & Ponack, L.L.P.

(57) ABSTRACT

The invention relates to a locking device for an adjustable steering column for a motor vehicle, wherein the locking device has a cam bracket having at least one cam arranged in a fixed manner thereon and at least one mating cam bracket having at least one mating cam arranged in a fixed manner thereon and at least one stop. The cam bracket and the mating cam bracket are arranged so as to be rotatable relative to each other around an axis of rotation, and the cam of the first cam bracket interacts with the mating cam of the mating cam bracket upon rotation of the cam bracket and mating cam bracket relative to each other around the axis of rotation in order to generate a stroke in the longitudinal direction of the axis of rotation. The locking device has at least one dampening body which has at least one elastically deformable material that is softer than the cam bracket and the stop, wherein the cam bracket, upon rotation of the cam bracket and the mating cam bracket relative to each other around the axis of rotation, contacts the stop in a stop position in such a way that the dampening body is positioned therebetween.

10 Claims, 3 Drawing Sheets

(56) References Cited

U.S. PATENT DOCUMENTS

| | | | |
|---|---|---|---|
| 5,503,431 | A | 4/1996 | Yamamoto |
| 5,596,907 | A | 1/1997 | Barton |
| 5,598,741 | A | 2/1997 | Mitchell et al. |
| 5,787,759 | A | 8/1998 | Olgren |
| 6,089,780 | A | 7/2000 | Lutz |
| 6,092,957 | A | 7/2000 | Fevre et al. |
| 6,095,012 | A | 8/2000 | Lutz |
| 6,173,822 | B1 | 1/2001 | Korb et al. |
| 6,860,669 | B2 * | 3/2005 | Laisement et al. ......... 403/109.1 |
| 2002/0062518 | A1 | 5/2002 | Hellwig et al. |
| 2006/0273567 | A1 * | 12/2006 | Fix ................... 280/775 |
| 2008/0143092 | A1 * | 6/2008 | Menjak et al. ............... 280/775 |
| 2008/0185829 | A1 | 8/2008 | Senn |
| 2008/0229867 | A1 | 9/2008 | Waibel et al. |
| 2009/0013817 | A1 | 1/2009 | Schnitzer et al. |
| 2009/0020995 | A1 * | 1/2009 | Kim .................. 280/775 |
| 2011/0064538 | A1 | 3/2011 | Oertle et al. |
| 2011/0156380 | A1 | 6/2011 | Dietz et al. |
| 2011/0290605 | A1 | 12/2011 | Krawczyk et al. |
| 2012/0144953 | A1 | 6/2012 | Schnitzer |
| 2012/0285286 | A1 | 11/2012 | Schnitzer et al. |
| 2013/0104688 | A1 | 5/2013 | Okada et al. |

FOREIGN PATENT DOCUMENTS

| | | |
|---|---|---|
| DE | 197 18 031 | 8/1998 |
| DE | 198 05 289 | 8/1998 |
| DE | 197 45 038 | 7/1999 |
| DE | 100 51 805 | 5/2002 |
| DE | 102 25 089 | 1/2003 |
| DE | 101 61 849 | 6/2003 |
| DE | 10 2006 024 749 | 12/2006 |
| DE | 10 2005 052 123 | 1/2007 |
| DE | 10 2005 043 988 | 3/2007 |
| DE | 10 2005 045 365 | 3/2007 |
| DE | 20 2005 021 095 | 5/2007 |
| DE | 10 2007 003 091 | 8/2008 |
| DE | 10 2008 011 618 | 7/2009 |
| DE | 10 2008 028 460 | 12/2009 |
| DE | 10 2008 024 405 | 1/2010 |
| DE | 10 2008 045 143 | 3/2010 |
| DE | 696 10 067 | 4/2011 |
| DE | 10 2009 055 973 | 6/2011 |
| DE | 10 2010 029 252 | 12/2011 |
| DE | 10 2011 054 196 | 12/2012 |
| EP | 0 592 278 | 4/1994 |
| EP | 0 600 700 | 6/1994 |
| EP | 0 782 951 | 7/1997 |
| EP | 0 802 104 | 10/1997 |
| EP | 1 747 967 | 1/2007 |
| EP | 1 795 425 | 6/2007 |
| EP | 1 870 309 | 12/2007 |
| EP | 2 003 364 | 12/2008 |
| FR | 2 802 166 | 6/2001 |
| FR | 2 822 782 | 10/2002 |
| FR | 2 834 680 | 7/2003 |
| GB | 2 087 808 | 6/1982 |
| JP | 2-92779 | 4/1990 |
| JP | 2000-16303 | 1/2000 |
| JP | 2005-193745 | 7/2005 |
| JP | 2008-230452 | 10/2008 |
| JP | 2010-184656 | 8/2010 |
| WO | 96/15931 | 5/1996 |
| WO | 2007/009576 | 1/2007 |
| WO | 2009/105798 | 9/2009 |
| WO | 2011/020538 | 2/2011 |
| WO | 2012/011424 | 1/2012 |
| WO | 2013/050095 | 4/2013 |
| WO | 2013/071317 | 5/2013 |
| WO | 2013/107486 | 7/2013 |
| WO | 2013/143635 | 10/2013 |

* cited by examiner

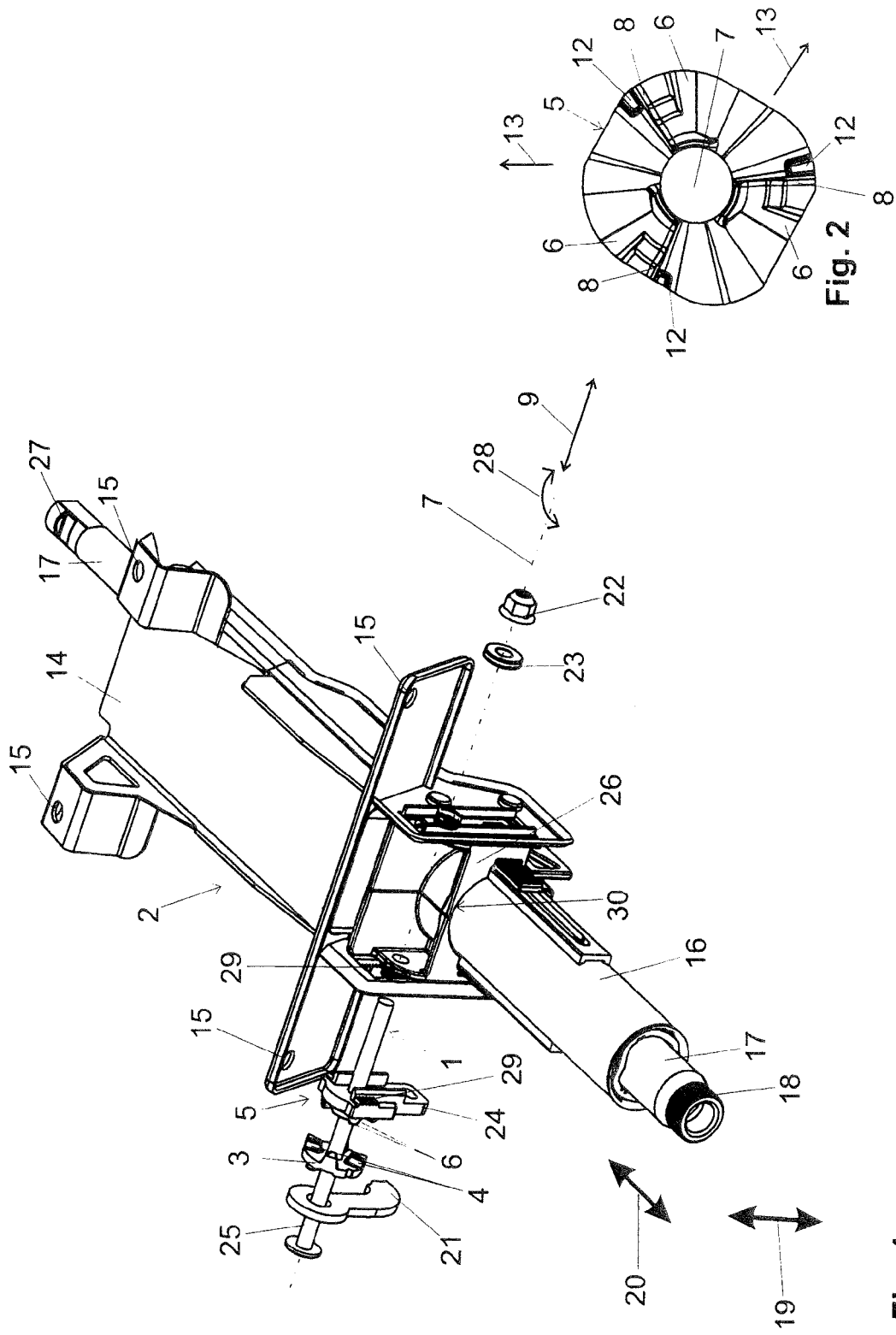

LOCKING DEVICE FOR AN ADJUSTABLE STEERING COLUMN

BACKGROUND OF THE INVENTION

The present invention relates to a securement device for an adjustable steering column for a motor vehicle. The securement device comprises a cam carrier with at least one cam fixedly disposed thereon and at least one countercam carrier with at least one countercam fixedly disposed thereon and with at least one stop. The cam carrier and the countercam carrier are disposed such that they are turnable relative to one another about a rotational axis, and the cam of the first cam carrier, during the turning of the cam carrier and the countercam carrier relative to one another about the rotational axis, cooperates with the countercam of the countercam carrier for generating a deflection in the longitudinal direction of the rotational axis.

Generic securement devices or clamping devices for adjustable steering columns are utilized in motor vehicles in order to be able to adapt the position of the steering wheel to the particular motor vehicle driver in the open position of the securement device. In its closed position, the securement device retains the steering columns in its preset position. For example, by means of a, most frequently, manually operable lever the cam carrier and the countercam carrier can be turned relative to one another. Different cam carriers and countercam carriers are known in prior art in which the cams and the countercams are formed out differently, thus also having cam or countercam contour faces differing from one another. The countercam carrier is frequently also referred to as the cam follower. However, this is merely a linguistic convention. In the last analysis the cam carrier and countercam carrier are each cam carriers with corresponding cams.

EP 1 747 967 A2 discloses a generic securement device for an adjustable steering column for a motor vehicle. On the cams of the cam carrier of this securement device depicted there, spring tongues are provided which in the closed position serve for arresting the cam carrier and the countercam carrier with one another. For this purpose, during the turning of the cam carrier and the countercam carrier against one another, an extension at the end of the countercams can be traversed by means of the spring tongue disposed on the cam on the path into the closed position such that the spring tongue can snap in behind the extension when the securement device is in its closed position.

The invention addresses the problem of improving a generic securement device to the effect that it enables offering the driver of the motor vehicle a comfortable and smooth actuation perception when turning the cam carrier and the countercam carrier against one another, that it is as low in wear as feasible and also as low in noise as feasible.

SUMMARY OF THE INVENTION

The above problem is resolved through a securement device as described below.

It is consequently provided for the securement device to comprise at least one damping body comprising at least one elastically deformable material that is softer than the cam carrier and the stop, wherein the cam carrier during the turning of the cam carrier and the countercam carrier relative to one another about the rotational axis impacts in an abutment position on the stop with the intermediate position of the damping body.

Stated differently, it is thus one fundamental concept of the invention to interpose at least in the abutment position a damping body between the cam carrier and at least one stop of the countercam carrier. This damping body prevents an abrupt hard impact of the cam carrier on the stop and thus provides an acceptable and smooth abutment perception to the motor vehicle driver, when he actuates the securement device and turns the cam carrier and the countercam carrier correspondingly far relative to one another about the rotational axis. The damping body, further, also damps noises and potential vibrations. If the intermediate position were to be absent, the cam carrier in the abutment position would impact on the stop without any damping. The damping body or the damping bodies are comprised of a softer material, thus of a different material, than the cam carrier and the stop. The material of the damping body is elastically deformable. On impact, the damping body is correspondingly compressed between the stop and the cam carrier.

The cam carrier, by means of a cam or several cams with the interposition of the or each damping body, impacts in the abutment position on the stop of the countercam carrier or on the stops of the countercam carrier. However, it can also be provided that the cam carrier comprises a separate portion or section or a separate counterstop to be differentiated from the cam, which counterstop in the abutment position with the interposition of the damping body impacts on the stop of the countercam carrier. It is understood that here also a multiplicity of counterstops and stops on the cam carrier and the countercam carrier and a multiplicity of damping bodies are feasible.

The cams or countercams are each projections or mountain ranges that project beyond a corresponding base of the cam carrier or the countercam carrier. They advantageously project in the direction parallel to the longitudinal direction of the rotational axis. However, the cams can also project radially with respect to the rotational axis beyond the corresponding base regions of the cam carrier and the countercam carrier. Cams and countercams advantageously comprise as sliding faces cam contour faces or countercam contour faces with which they slide along one another during the turning of the cam carrier and the countercam carrier relative to one another about the rotational axis. The cam contour faces or countercam contour faces advantageously do not have a stop function. The faces with which the cam carrier with the interposition of the damping body or the damping bodies impact on the stop of the countercam carrier are thus advantageously separate from the cam contour faces or countercam contour faces. Cams and countercams can be extensions disposed fixedly, preferably unitarily, on the cam carrier or the countercam carrier. Apart from the unitary outforming of the cam and the cam carrier or the countercam and the countercam carrier, it is also conceivable to secure the cam and the countercam in a different manner on the cam carrier or the countercam carrier. It can also be provided for the cam and/or countercam to comprise roll-off bodies such as rollers or balls with which they slide or roll along on the particular cam or countercam. Preferred embodiments of the invention, however, provide in any case that the cam or cams and countercam or countercams cooperate exclusively by sliding along one another and thus without a roll-off movement. Securement devices according to the invention can be provided for fixing the steering column in its closed position under friction closure as well as also under form closure. Both types, thus friction closure and form closure, are known per se and do not need further explanation here.

In terms of simple and cost-effective production of securement devices according to the invention, preferred variants provide for the damping body to be initially a separately fabricated structural part that is subsequently secured on the cam carrier or on the countercam carrier. The damping bodies can be secured directly on the cam carrier, for example directly on its cam or counterstops, or on the stop of the countercam carrier. If several stops are provided, it is advantageous to assign a damping body each to a particular stop. As already indicated above, the damping body comprises advantageously at least one elastically deformable body. The damping body can also be comprised entirely of such an elastically deformable body. The elastically deformable body or damping body advantageously is an elastomer body, such as for example rubber or another elastomer. The damping body, for the sake of simplicity, can be comprised of a monomaterial and thus of a single material. At a corresponding compression stress in the abutment position the elastically deformable material of the damping body advantageously leads to an energy degradation and thus to a conversion of the forces or energy introduced into the system into heat, such that the desired damping effect is generated. The damping body advantageously has rubber-elastic properties.

As already indicated, it can be provided for the cam carrier to impact on several stops of the countercam carrier in the abutment position with the interposition of several damping bodies. Herein, it is again feasible that the cam carrier in the abutment position with the interposition of several damping bodies impacts with several cams on several stops of the countercam carrier. As already explained in the introduction, it is understood that it is also feasible that the cam carrier comprises abutment regions or counterstops, separate from the cams, to which the corresponding explanations can apply. In terms of simple production and assembly, if there are several damping bodies, it is preferably provided for the damping bodies to be part of a common contiguous structural damping body part which is initially fabricated as a separate structural part and subsequently secured on the cam carrier or on the countercam carrier. The common structural damping body part can subsequently be secured in a single operating step or as an entity as a prefabricated structural part on the cam carrier or the countercam carrier or on the cams or countercams. It is in principle conceivable for the damping bodies to come into operation or to be effective upon reaching the closed position and/or also upon reaching the open position of the securement device. However, preferred embodiments of the invention provide in this context for the securement device to be in the open position when the cam carrier during the turning of cam carrier and countercam carrier relative to one another about the rotational axis in the abutment position, with the interposition of the damping body, impacts on the stop. In these embodiments, the damping bodies consequently dampen the braking of the opening of the manual operating lever at the end of the rotation movement. Vibrations and rattling noises in the open position of the manual operating lever can thereby be avoided.

The cooperation of the cam carrier and the stop of the countercam carrier with the interposition of the damping body or bodies forms overall a soft and attenuated stop function. In order to provide additionally a definitive end of the turning out-of-position possibility between the cam carrier and the countercam carrier, preferred embodiments of the invention provide for the countercam carrier, in addition to the stop or the stops, to comprise at least one end stop on which the cam carrier impacts in an end abutment position which differs from the abutment position. This end stop advantageously cooperates with a counterend stop or several counterend stops on the cam carrier, whose hardness is greater than the hardness of the damping body. In the simplest case the counterend stop or stops are each formed by an areal segment on each cam of the cam carrier, which is in direct contact with an end stop in the end abutment position. Between the end stop or the end stops and the particular counterend stops no damping body is provided, such that a hard end abutment position is reached. It is advantageously provided for the cam carrier, starting from the abutment position, to be movable into the end abutment position by the turning about the rotational axis relative to the countercam carrier with advancing compression of the damping body. In this manner, the maximally feasible compression of the damping body can be dimensioned in particular in order to produce continuous service capability and preferably a comfortable and smooth limitation function. The abutment faces of stop and end stop or stops as well as the end stops and counterend stops can extend parallel to the rotational axis. However, it is also feasible to provide an acute angle between rotational axis and these abutment faces. This acute angle is advantageously between 2° and 10°, preferably between 5° and 8°. Viewed toward the rotational axis, the angles of the abutment faces of stop and end stop are preferably different with respect to one another.

Reference should in principle be made to the fact that, in terms of good longevity of the damping bodies, it is advantageously provided that these are essentially acted upon by means of compression. There can be provided minor shearing components of the stress loading. However, there can also be an exclusive compression stress on the damping body.

The stop or stops are advantageously disposed with respect to the rotational axis in the radial direction and/or in the longitudinal direction of the rotational axis such that they are spaced apart from the end stop or the end stops on the countercam carrier.

BRIEF DESCRIPTION OF THE DRAWINGS

In the Figures an embodiment example according to the invention is explained, in which:

FIG. 1 shows a steering column for a motor vehicle with a securement device according to the invention;

FIG. 2 shows a top view from the direction parallel to the rotational axis onto the countercam carrier with its countercams;

DETAILED DESCRIPTION OF THE INVENTION

Figure 3:
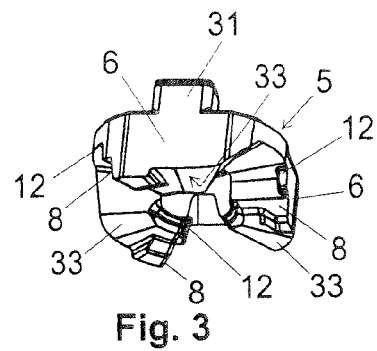
FIGS. 3 and 4 show perspective or side views of the countercam carrier.

In FIG. 1 is depicted an adjustable steering column 2 implemented according to the invention, wherein, first, the features known per se in prior art of this steering column will be briefly described without implying that in the steering columns 2 according to the invention these features known per se in prior art need to be realized.

In the embodiment example depicted in FIG. 1, the adjustable steering column 2 comprises a bracket unit 14 which is secured by means of securement plates 15 on the body of a motor vehicle. On the bracket unit 14, optionally via a corresponding intermediate lever 26 known per se, a steering spindle bearing unit 16 is displaceably supported. To enable displacement, the securement device 1 must first be brought into its open position. In this open position of the securement device 1, the steering spindle bearing unit 16 together with the steering spindle 17 can be displaced in the length and/or height direction. In the depicted embodiment example, both displacement directions are possible. Double arrow 19 indicates the possible directions in the height displacement. Double arrow 20 indicates the directions in the length displacement. On the steering wheel adapter 18, the steering wheel, not shown here, can be secured on the steering spindle 17. On the front end 27 of the steering spindle 17, a universal joint or a steering gearing, for example with electric auxiliary power support known by the name "Colpas", can be disposed.

When the desired adjustment of the position of the steering spindle bearing unit 16, and therewith of the steering wheel, has been completed, the securement device 1, here depicted in an exploded view, is brought again into its closed position in which the position of the steering spindle bearing unit 16 is fixed relative to the bracket unit 14 and therewith to the body of the motor vehicle.

In the depicted embodiment example, the securement device 3 is moved by means of a manual operating lever 21, here only shown shortened, between its open position and its closed position. The manual operating lever 21 in the depicted embodiment example is turnable, together with the cam carrier 3 or the countercam carrier 5, here together with the cam carrier 3, about the rotational axis 7 extending in this embodiment example coaxially through the clamp bolt 25. The countercam carrier 5 in this embodiment example is secured torque-proof on the bracket unit 14 via the intermediate part 24. By turning the manual operating lever 21 together with the cam carrier 3, the cam carrier 3 and the countercam carrier 5 are turned relative to one another about the rotational axis 7 over a correspondingly preset turning angle 28 against one another. The clamp bolt 25 of this embodiment example is secured on the side opposite the manual operating lever 21 by means of bearing washer 23 and counternut 22. The bearing washer 23 can also be replaced by an axial bearing.

The cam carrier 3 in this embodiment example comprises integrally formed-on cams 4 and the countercam carrier 5 and comprises integrally formed-on countercams 6. The cam carrier 3 and the countercam carrier 5 are disposed opposite one another such that they are turnable against one another about the rotational axis 7. The longitudinal direction of the rotational axis 7 is denoted by 9. When turning the cam carrier 3 against the further countercam carrier 5 along the turning angle 28 about the rotational axis 7, the cams 4 of cam carrier 3 are each in contact with their cam contour faces on one countercam contour face 33 of the countercams 6 of countercam carrier 5 such that they slide along one another. For the sake of completeness reference is made to the fact that the number of the cams 4 and countercams 6 disposed on the cam carrier 3 and the countercam carrier 5, respectively, can vary. The minimum in each case is a single cam 4 or countercam 6 for each cam carrier 3 or countercam carrier 5, respectively. The cam carrier 3 and the countercam carrier 5 in the depicted embodiment example each have three cams 4 and countercams 6, respectively. However, as stated, the number of cams 4 and countercams 6 can vary or assume different values. It is in any case advantageous if one cam 4 each of cam carrier 3 cooperates with one countercam 6 of countercam carrier 5.

As already explained in the introduction, for the sake of completeness reference is made to the fact that configurations according to the invention of cam carriers 3 and countercam carriers 5 can be employed in securement devices 1 that operate under friction closure as well as also form closure. In the depicted embodiment example, the toothings 29 reveal that here, with respect to the height displacement in the direction of double arrow 19, a securement device 1 operating under form closure is involved and, in the length displacement direction in the direction of double arrow 20, a friction-closure connection is involved along the contact faces 30 between the intermediate lever 26 and the steering spindle bearing unit 16.

FIG. 2 shows a top view onto the countercams 6 of countercam carrier 5. Drawn in is also the rotational axis 7 about which the cam carrier 3 and the countercam carrier 5 are turned against one another through the actuation of the manual operating lever 21, as well as by example also shown is the radial directions 13.

Figure 5:
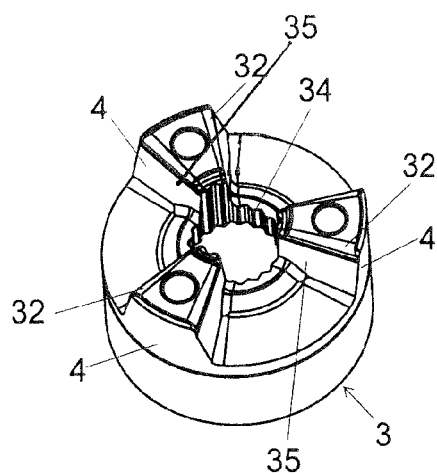
FIG. 5 shows the cam carrier with its cams.
Figure 7:
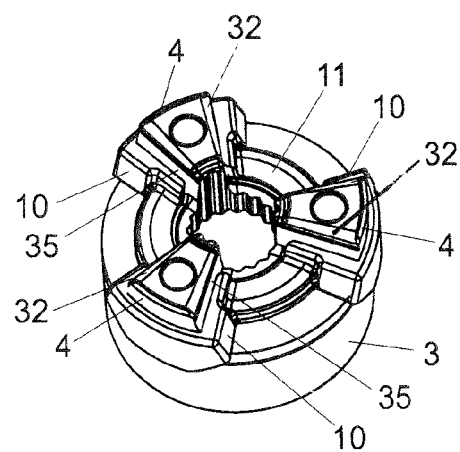
FIG. 7 shows the cam carrier with the structural damping body part emplaced thereon.

In the top view selected in FIG. 2, the view is directed onto the countercam contour faces 33, which are realized area by area as a type of ramp, of the countercams 6, along which slide the cam contour faces 32 of the cams 4, which will be explained further and which are depicted in FIGS. 5 and 7, of cam carrier 3 in order to generate the deflection required for the displacement of the securement device 1 in the longitudinal direction 9 of rotational axis 7. In the top view according to FIG. 2 can also be seen the stops 8 and the end stops 12. Stop 8 is the stop or the stops on which the cam carrier 3 impacts onto these stops 8 with the intermediate positioning of the damping bodies 10. By 12 are denoted the end stops which maximally delimit the turning path of cam carrier 3 relative to countercam carrier 5. The end stops 12 cooperate with the counterend stops 35 on cam carrier 3 (cf. FIGS. 5 and 11). Additional damping is here not provided.

Stops 8 and end stops 12 can be disposed such that they are spaced apart in the radial direction 13 and/or in the longitudinal direction 9 of the rotational axis 7.

Figure 4:
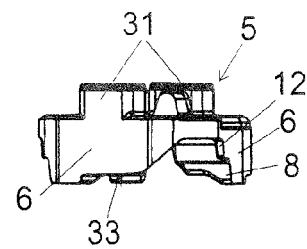

In the perspective depiction of countercam carrier 5 in FIG. 3 as well as also in the side view according to FIG. 4 can additionally be seen the fixing pegs 31 with which the countercam carrier 5 in this embodiment example is secured torque-proof on the intermediate part 24 and therewith on the bracket unit 14.

FIG. 5 shows a perspective view onto the cam carrier 3 of this embodiment example according to the invention. In addition to the cams 4 and their cam contour faces 32, the form-closure element 34 of this embodiment example can also be seen, which element serves for securing the cam carrier 3 torque-proof on the clamp bolt 25. Further depicted are the counterend stops 35.

Figure 6:
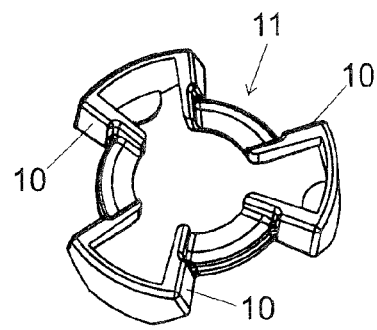
FIG. 6 shows the structural damping body part detached from the cam carrier.

FIG. 6 shows the structural damping body part 11 which realizes all damping bodies 10 of this embodiment example in the form of a common contiguous structural part that is initially fabricated as a separate structural part and subsequently secured in this embodiment example on the cam carrier 3. In the depicted embodiment, this structural damping body part 11 is shaped annularly. The structural damping body part 11 can be implemented for example as a plug-on body which, after it has been emplaced on the cam carrier 3 or also on the countercam carrier 5, is secured thereon. The securement can be realized by friction closure, form closure, such as for example snapping-in, riveting, bolting, or also by other conventional variants of securement. In the depicted embodiment example this involves, as is also preferably provided, a unitary structural part of a single material. The material of the structural damping body part 11 can be for example elastomers such as, for example, rubber or the like. It is understood that multipart structures with different materials are also conceivable.

FIG. 7 shows the structural damping body part 11 in the position secured on cam carrier 3. The damping bodies 10, which in this embodiment example are employed for the damping effect, are labeled in FIG. 7. The structural damping body part 11 is herein developed such that the counterend stops 35 are exposed on the cam carrier 3 such that these can cooperate with the end stops 12 on countercam carrier 5.

Different positions of the securement device 1 are shown in conjunction with FIGS. 8 to 11. As is also realized here, the securement device 1 can also incorporate the clamp bolt 25 in addition to the cam carrier 3 and the countercam carrier 5 and the damping bodies 10 according to the invention. In the depicted embodiment example, as is advantageously realized, the cam carrier 3 as well as also the countercam carrier 5 is mounted on the clamp bolt 25. The rotational axis 7 corresponds here to the longitudinal center axis of the clamp bolt 25.

Figure 8:
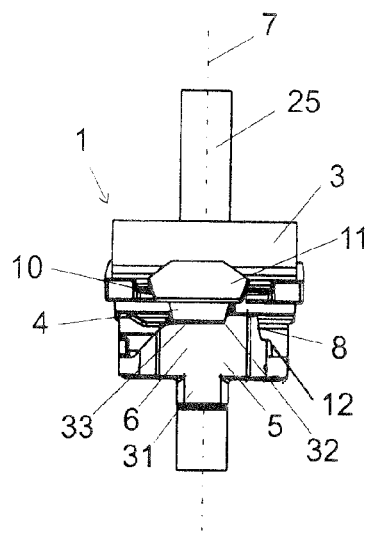
FIG. 8 shows the securement device in the closed position.

FIG. 8 shows the securement device 1 of this embodiment example in the closed position. Cam carrier 3 and countercam carrier 5 are in this position so turned against one another that between them the maximal distance is set. The cam contour face 32 in this state of the closed position is in contact on a correspondingly elevated region of the countercam contour face 33 of the corresponding countercams 6. This position is maintained through friction closure and only discontinued when the manual operating lever 21 of this embodiment example is correspondingly actuated. Reference should here be made to the fact that, instead of a manual operating lever, motor actuation of the securement device 1 is also conceivable and feasible.

Figure 9:
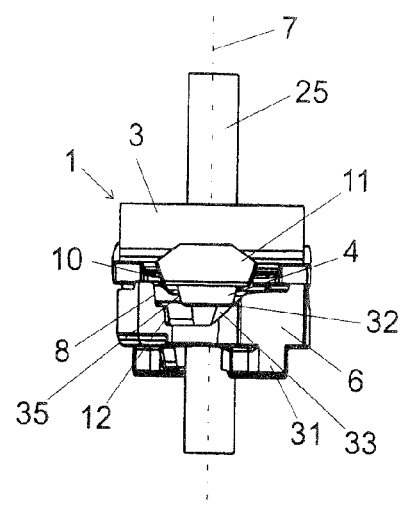
FIG. 9 shows the securement device in an intermediate position.
Figure 10:
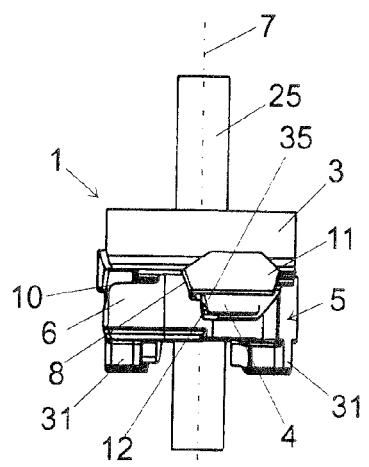
FIG. 10 shows the abutment position in the open position of the securement device.
Figure 11:
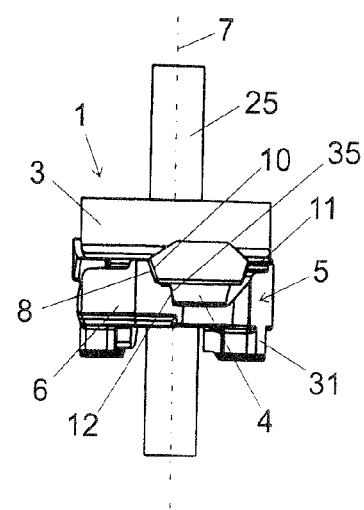
FIG. 11 shows the entry into force of the end stop in the maximally open position.

FIG. 9 shows an intermediate position of the securement device 1 between the closed position and its open position. In the position shown in FIG. 9, the cam contour face 32 is in the process of sliding over the ramps of the countercam contour face 33. In FIG. 10, the securement device 1 is in a first open position in which the adjustable steering column 2 can be displaced in the directions 19 and/or 20. FIG. 10 shows the abutment position in which the cam carrier 3, with the interposition of the particular damping bodies 10, impacts on stops 8 of the countercam carrier 5. In the variant depicted here this is executed by the cam carrier 3 with its cams 4. In this open position a certain friction closure is advantageously already given which, without force expenditure on the manual operating lever 21, retains the securement device 1 in this position. If the manual operating lever 21 in this embodiment example is acted upon further in the open direction, this leads to a compression of the damping bodies 10 which progresses with the rotational angle and leads to a further turning of the cam carrier 3 against the countercam carrier 5 until, as shown in FIG. 11, the end abutment position has been reached in which cam carrier 3 here impacts with its counterend stops 35 on the end stops 12 of the countercam carrier 5. In the embodiment example, the cam carrier 3 with a portion of the face of the counterstop 35 is in contact on stop 8 in the abutment position with the interposition of the damping body 10. The damping body 10 is herein compressed. The damping body 10 accordingly partially covers the face of the counterend stop 35 and therewith of cam carrier 3. The non-covered region of counterend stop 35 cooperates directly with the end stop 12 to delimit the turning. It is advantageously provided for cam carrier 3 and countercam carrier 5 to be also in the end abutment position according to FIG. 11 arrested by themselves under friction closure. Through the depicted measures, moreover, vibrations in the open state of the securement device 1 are largely avoided. The effects described in the introduction of a comfortable and smooth operating perception and of ensuring a long service life of the damping body are attained.

LEGEND TO THE REFERENCE NUMBERS

1 Securement device
2 Steering column
3 Cam carrier
4 Cam
5 Countercam carrier
6 Countercam
7 Rotational axis
8 Stop
9 Longitudinal direction
10 Damping body
11 Structural damping body part
12 End stop
13 Radial direction
14 Bracket unit
15 Securement plates
16 Steering spindle bearing unit
17 Steering spindle
18 Steering wheel adapter
19 Direction
20 Direction
21 Manual operating lever
22 Counternut
23 Bearing washer
24 Intermediate part
25 Clamp bolt
26 Intermediate lever
27 End
28 Turning angle
29 Toothing
30 Contact face
31 Fixing peg
32 Cam contour face
33 Countercam contour face
34 Form closure element
35 Counterend stop

The invention claimed is:

1. A securement device for an adjustable steering column for a motor vehicle, comprising: a cam carrier with at least one cam fixedly disposed thereon and at least one countercam carrier with at least one countercam fixedly disposed thereon and with at least one stop, wherein the cam carrier and the countercam carrier are disposed such that the cam carrier and the countercam carrier are turnable relative to one another about a rotational axis, and the cam of the first cam carrier, upon the turning of the cam carrier and the countercam carrier relative to one another about the rotational axis, cooperates with the countercam of the countercam carrier for generating a deflection in a longitudinal direction of the rotational axis, wherein the securement device comprises at least one damping body which comprises at least one elastically deformable material that is softer than the cam carrier and the stop, wherein the cam carrier, during the turning of the cam carrier and the countercam carrier relative to one another about the rotational axis, impacts in an abutment position on the stop with the interposition of the damping body.

2. The securement device as in claim 1, wherein the damping body is an initially separately fabricated structural part and subsequently secured on the cam carrier or on the countercam carrier.

3. The securement device as in claim 1, wherein the damping body comprises at least one elastically deformable body.

4. The securement device as in claim 1, wherein the damping body is one of a plurality of damping bodies, the stop is one of a plurality of stops, and the cam carrier in the abutment position with the interposition of the damping bodies impacts on the stops of the countercam carrier.

5. The securement device as in claim 4, wherein the damping bodies are part of a common contiguous structural damping body part which is initially fabricated as a separate structural part and subsequently secured on the cam carrier or on the countercam carrier.

6. The securement device as in claim 1, wherein the securement device is in an open position for the adjustment of the steering column and at least one closed position for arresting the steering column, wherein the securement device is in the open position when the cam carrier, during the turning of the cam carrier and the countercam carrier relative to one another about the rotational axis, impacts in the abutment position on the stop with the interposition of the damping body.

7. The securement device as in claim 1, wherein the countercam carrier, in addition to the at least one stop, comprises at least one end stop on which the cam carrier impacts in an end abutment position differing from the abutment position.

8. The securement device as in claim 7, wherein the cam carrier, starting from the abutment position, is movable into the end abutment position with the progressing compression of the damping body by the turning about the rotational axis relative to the countercam carrier.

9. The securement device as in claim 7, wherein the at least one stop is disposed on the countercam carrier spaced apart from the at least one end stop with respect to the rotational axis in the radial direction and/or in the longitudinal direction of the rotational axis.

10. The securement device as in claim 1, wherein the at least one cam and the at least one countercam cooperate exclusively by sliding along one another.

* * * * *